United States Patent [19]

Steinberg

[11] 3,871,553

[45] Mar. 18, 1975

[54] DISPENSING GUN FOR SEMI-LIQUID MATERIAL

[75] Inventor: Richard W. Steinberg, Owatonna, Minn.

[73] Assignee: Owatonna Tool Company, Owatonna, Minn.

[22] Filed: June 13, 1974

[21] Appl. No.: 478,878

Related U.S. Application Data

[63] Continuation of Ser. No. 341,341, March 15, 1973, abandoned.

[52] U.S. Cl. ................................. 222/95, 222/397
[51] Int. Cl. ........................................... B65d 35/28
[58] Field of Search .............. 222/95, 96, 396, 397; 221/211; 285/190; 401/188

[56] References Cited
UNITED STATES PATENTS

| | | | |
|---|---|---|---|
| 3,258,176 | 6/1966 | Raczynski | 222/397 |
| 3,357,601 | 12/1967 | Crawford et al. | 222/397 |
| 3,495,622 | 2/1970 | Rose | 222/396 X |
| 3,741,438 | 6/1973 | Gardioni | 222/96 |

Primary Examiner—Stanley H. Tollberg
Assistant Examiner—John P. Shannon
Attorney, Agent, or Firm—Wegner, Stellman, McCord, Wiles & Wood

[57] ABSTRACT

A dispensing gun for semi-liquid material such as gasket material carried in a collapsible tube and having a body provided with an interior chamber with an air inlet orifice opening for delivery of compressed air into the chamber and with a pair of air outlet orifices with one outlet orifice being a pressure relief orifice and the other outlet orifice being manually closable by an operator whereby closing of the latter orifice causes a static pressure in the chamber which progressively collapses the tube of material to force material from the dispensing tip thereof and outwardly of the gun body. The pressure relief orifice has a ball check associated therewith which is urged to a position to close the latter orifice and with means provided for varying the force of the spring urging the ball check closed whereby the value of the static pressure in the chamber may be varied.

4 Claims, 4 Drawing Figures

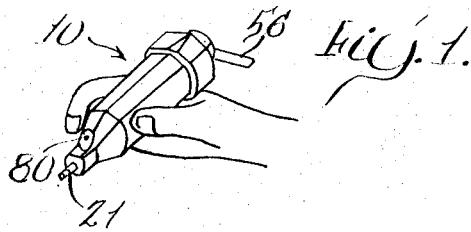
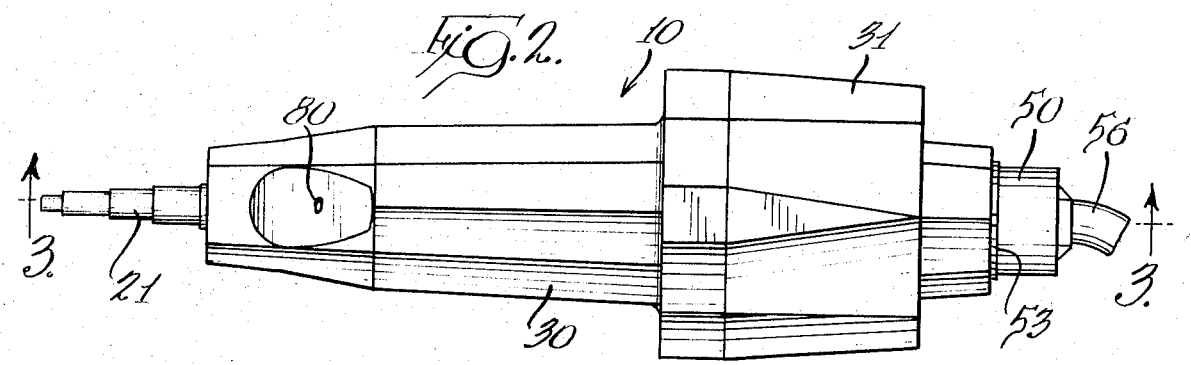
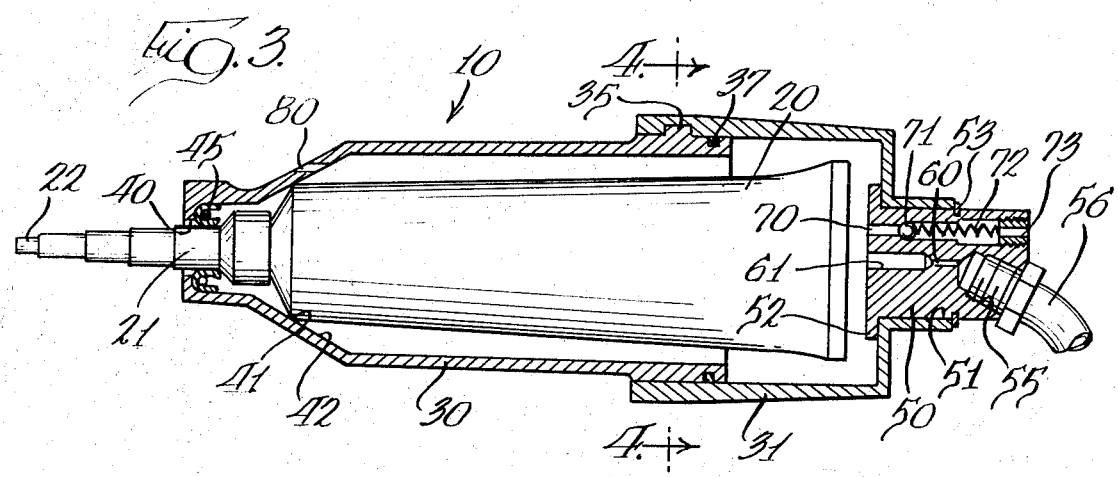
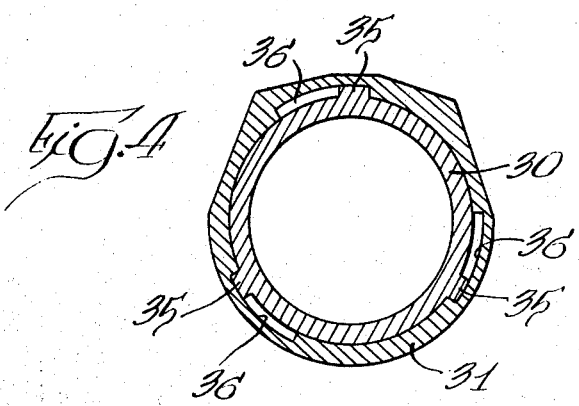

DISPENSING GUN FOR SEMI-LIQUID MATERIAL

This is a continuation of application Ser. No. 341,341 filed Mar. 15, 1973, now abandoned.

BACKGROUND OF THE INVENTION

This invention relates to dispensing guns for semi-liquid material such as gasket material carried in a collapsible tube and operable by air pressure supplied from a compressed air line commonly found in industrial shops, garages and the like.

The patents to Schumann et al. U.S. Pat. No. 3,439,839, Theodorou U.S. Pat. No. 2,784,878 and Moore U.S. Pat. No. 3,282,473 disclose various types of dispensing devices using air pressure to dispense material from a collapsible tube. These patents disclose the supply of compressed air to a chamber being controlled by an on-off valve.

The Raczynski U.S. Pat. No. 3,258,176, does not relate to dispensing of semi-liquid material, but does disclose the selective dispensing of a liquid from a container by use of air pressure which is controlled by manually closing an opening in an air line.

The foregoing patents do not disclose a simply operated dispensing gun for a semi-liquid material, such as gasket material, which provides for instant release of the static pressure in the chamber of the dispensing gun and which provides variable setting of the value of the static pressure within the chamber which acts on the collapsible tube to provide progressive collapse thereof for dispensing of material.

SUMMARY OF THE INVENTION

A primary feature of the invention disclosed herein is to provide a dispensing gun for semi-liquid material carried in a collapsible tube which is manually operable without valves and with the dispensing gun being of a simple construction whereby the low cost thereof facilitates the utilization of the available compressed air for dispensing of the material.

Another feature of the invention is to provide a dispensing gun as defined in the preceding paragraph wherein a static pressure is established within the gun for collapsing of the tube and dispensing of material solely by a plurality of orifice passages with there being an inlet orifice through which the compressed air reaches the chamber and with a pair of outlet orifices. One outlet orifice is closable by the finger of an operator and the second orifice is a pressure relief orifice of a size greater than the inlet orifice and having a spring-loaded ball check associated therewith for normally closing the latter outlet orifice but permitting escape of air from the chamber therethrough when the first outlet orifice is closed by the finger of an operator to establish a static pressure within the chamber of the gun and with this pressure being determined by the force of the spring acting to hold the ball check closed.

An object of the invention is to provide a dispensing gun for semi-liquid material, such as gasket material, carried in a collapsible tube by the use of compressed air wherein a static pressure is created within a chamber of the gun by selective control of air inlet and air outlet orifices without the utilization of expensive manually-operable on-off valves and with instantaneous release of the static pressure when dispensing is to be discontinued.

Another object of the invention is to provide a dispensing gun as defined in the preceding paragraph wherein the gun has a two-part body with a quick detachable connection therebetween to permit insertion of a collapsible tube within the chamber of the body and with the air inlet and a pressure relief orifice being carried in a fitting rotatably mounted in the body whereby the fitting is connectable to a compressed air hose and the gun may be easily adjusted relative to the hose during use.

BRIEF DESCRIPTION OF THE DRAWING

FIG. 1 is a perspective view showing the dispensing gun as manually held by an operator and positioned for control of dispensing by a finger of the operator;

FIG. 2 is a plan view on an enlarged scale of the dispensing gun shown connected to a compressed air line and having the dispensing tip of a collapsible tube of material extended therefrom;

FIG. 3 is a vertical section, taken generally along the line 3—3 in FIG. 2; and

FIG. 4 is a vertical transverse section, taken generally along the line 4—4 in FIG. 3.

DESCRIPTION OF THE PREFERRED EMBODIMENT

The dispensing gun is shown in use in FIG. 1, with the structure thereof being shown in detail in FIGS. 2 to 4. The dispensing gun has a body, generally indicated at 10, which may be held within the hand of an operator and with a control to be described provided whereby one finger of the operator can control the dispensing of material from the gun.

Referring particularly to FIG. 3, the dispensing gun provides for utilization of compressed air to progressively collapse a tube 20 positioned within the body 10 of the dispensing gun and having a dispensing tip 21. The material within the tube 20 is semi-liquid and, for example, may be gasket material and the structure of the tube itself is well known in the art whereby compressive forces applied to the tube wall will cause collapse thereof to cause expelling of material through the tip 21. The tip 21 is commonly made of substantial length and may be cut at a desired point to set the desired diameter of material being delivered from the tip. An internal passage through the tip is opened by cutting off an end part 22 of the tip.

The gun body 10 is made up of two body parts 30 and 31 which, when in assembled relation, define an internal chamber to receive the collapsible tube 20. The body parts 30 and 31 are secured together by a quick release connection in the form of a bayonet-type joint, with a series of radial projections 35 on the body part 30 being insertable into axially-extending slots in the body part 31 until a depth is reached wherein relative rotation between the body parts causes the radial projections 35 to be locked into circumferentially-extending sections 36 of the bayonet joint formed in the body part 31. An O-ring seal 37 engages between the body parts to provide an effective seal against loss of air.

The body part 30 has an outlet opening 40 through which the dispensing tip 21 of the tube extends and with the outer movement of the tube relative to the gun being limited by engagement of a shoulder 41 on the collapsible tube 20 with a sloped interior wall 42 of the gun body part 30. In order to provide a seal against air leakage, a spring-loaded seal 45 is fitted within the outlet opening 40 and is in compressive engagement with the dispensing tip 21.

The body part 31 is provided with a rotatable fitting 50 fitted into a cylindrical opening 51 in the body part. The fitting has a flange 52 held in abutting relation with the body part 31 by a snap ring 53. The fitting 50 has a connection 55 to a compressed air hose 56 which delivers pressure air to an air inlet orifice 60 which communicates with the internal chamber of the body through a passage 61. The fitting 50 also has an air outlet orifice including a passage 70 which connects the internal chamber with the exterior of the gun and a ball check 71 which is urged to a position to close the passage 70 by a spring 72. The force of the spring 72 may be adjusted by a vented adjusting screw 73 which is threaded into the bore of the fitting 50 which houses the ball check 71 and the spring 72.

An additional air outlet orifice 80 extends through the sloped wall of the body part 30 and has its exterior end located for opening and closing thereof by a finger of the operator.

There is a ratio of sizes between the respective orifices, with the pressure relief orifice 70 and the second outlet orifice 80 having a diameter greater than that of the air inlet orifice 60.

With pressure air supplied to the gun, there is no pressure builtup in the chamber within the body 10 when the outlet orifice 80 is open. When the outlet orifice 80 is closed by the finger of an operator, there is a buildup of static pressure within the chamber of the dispensing gun to a value determined by the pressure setting of the ball check 71. The pressure relief orifice established by opening ball check 71 maintains a minimal bypass of air through the gun with a constant static pressure within the chamber to progressively collapse the tube 20 and dispense material from the tip 21 of the tube. Release of the finger from the outlet orifice 80 instantly releases the pressure within the chamber.

The static pressure may be set to a desired value within the chamber of the dispensing gun by adjustment of the spring 72 and can take into account the pressure of the compressed air that is delivered through the hose 56 and which may vary at various locations where the dispensing gun would be used.

The rotatable fitting 50 enables positioning and orientation of the dispensing gun to place the dispensing tip 21 at a desired location with minimal interference from the connection of the gun to the hose 56.

I claim:

1. A dispensing gun for semi-liquid material carried in a collapsible tube and adapted for connection to a compressed air line in an industrial shop or the like comprising, a body defining an interior chamber for the tube, an outlet opening at one end of the body to receive the dispenser tip of the tube, a pressure air inlet orifice adjacent the other end of the body to limit the air flow into the chamber and reduce the pressure thereof, a pair of air outlet orifices from said body both of a size greater than said air inlet orifice, one of said outlet orifices being a pressure relief passage and a ball check valve positioned to close said pressure relief passage, a spring acting on said ball check valve, the other air outlet orifice being selectively closable by a user of the gun whereby closure of the latter orifice establishes a static pressure in the chamber to progressively collapse said tube and cause dispensing of material, and means for adjusting the force of said spring to vary the static pressure in said chamber.

2. A dispensing gun as defined in claim 1 wherein said body carries a fitting provided with the pressure air inlet orifice and the pressure relief passage, means for holding the fitting in secured relation to the body while permitting rotation thereof and a pressure air hose connection in said fitting providing for flow of pressure air to said pressure air inlet orifice whereby positioning of said gun relative to the pressure air hose is facilitated.

3. A dispensing gun for a semi-liquid material carried in a collapsible tube having a dispensing tip at one end comprising, a two-part body defining a tube-receiving chamber and with quick detach structure between the body parts to facilitate insertion and removal of a tube and with a sealing member between the body parts, an outlet opening at one end of the body to receive said tip, a rotatable fitting at an opposite end of the body having a connection to a compressed air hose and in communication with an inlet orifice to said chamber, a pressure relief passage in said fitting for flow of air from said chamber and a ball check yieldably urged toward said pressure relief passage to modulate flow from the chamber and maintain a minimal bypass of air to obtain a constant static pressure in the chamber, and a second outlet orifice for flow of air from said chamber positioned for manual closure by an operator, said pressure relief passage and second outlet orifice being larger than said air inlet orifice whereby when said second outlet orifice is open there is no pressure in said chamber but when said second outlet orifice is closed there is constant static pressure in said chamber as established by the pressure relief passage and ball check which progressively collapses said tube and dispenses material through the tip thereof.

4. A dispensing gun as defined in claim 3 wherein said ball check is urged to a closed position by a spring, and means for adjusting the force of the spring to adjust said static pressure.

* * * * *